United States Patent
Ping

(10) Patent No.: US 9,841,904 B2
(45) Date of Patent: Dec. 12, 2017

(54) SCALABLE AND CONFIGURABLE NON-VOLATILE MEMORY MODULE ARRAY

(71) Applicant: Samsung Electronics Co., Ltd., Suwon-si, Gyeonggi-do (KR)

(72) Inventor: Zhan Ping, Milpitas, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 317 days.

(21) Appl. No.: 14/809,165

(22) Filed: Jul. 24, 2015

(65) Prior Publication Data

US 2016/0259551 A1 Sep. 8, 2016

Related U.S. Application Data

(60) Provisional application No. 62/127,210, filed on Mar. 2, 2015.

(51) Int. Cl.
| | |
|---|---|
| *G06F 12/00* | (2006.01) |
| *G06F 13/00* | (2006.01) |
| *G06F 3/06* | (2006.01) |
| *G06F 13/40* | (2006.01) |

(52) U.S. Cl.
CPC .......... *G06F 3/061* (2013.01); *G06F 3/0655* (2013.01); *G06F 3/0688* (2013.01); *G06F 13/4022* (2013.01)

(58) Field of Classification Search
CPC .... G06F 3/0629; G06F 3/0638; G06F 3/0644; G06F 2212/2022; G06F 2212/214; G06F 2212/2146; G06F 2212/7206; G06F 2212/7208
See application file for complete search history.

(56) References Cited

U.S. PATENT DOCUMENTS

| | | | |
|---|---|---|---|
| 8,296,476 B2 | 10/2012 | Zhang et al. | |
| 8,589,723 B2 | 11/2013 | Kumar et al. | |
| 2001/0052038 A1* | 12/2001 | Fallon | G06F 3/0613 710/68 |
| 2008/0126698 A1* | 5/2008 | Honda | G06F 3/0607 711/114 |
| 2009/0319716 A1* | 12/2009 | Nagadomi | G06F 13/1684 710/316 |

(Continued)

*Primary Examiner* — Sean D Rossiter
(74) *Attorney, Agent, or Firm* — Renaissance IP Law Group LLP

(57) ABSTRACT

Embodiments of the inventive concept include a non-volatile memory module array system. The system can include non-volatile memory modules each including a first port, a second port, solid state drives, a switch, and a port configuration logic section. The system can include a bus connected to the first or second ports. The system can include a host to communicate with the non-volatile memory modules via the bus. The port configuration logic section can toggle between a first port configuration associated with the second port and a second port configuration associated with the second port. The port configuration logic section can include a first non-volatile configuration section to store the first and second port configurations associated with the second port. The first port configuration can cause the second port to operate as a downstream port. The second port configuration can cause the second port to operate as an upstream port.

22 Claims, 7 Drawing Sheets

(56) References Cited

U.S. PATENT DOCUMENTS

| | | | |
|---|---|---|---|
| 2011/0161580 A1* | 6/2011 | Shah | H04L 49/10 |
| | | | 711/108 |
| 2012/0023278 A1* | 1/2012 | Jinno | G06F 3/0605 |
| | | | 710/300 |
| 2013/0086311 A1 | 4/2013 | Huang et al. | |
| 2013/0135816 A1 | 5/2013 | Huang | |
| 2014/0189212 A1 | 7/2014 | Slaight et al. | |
| 2014/0281040 A1 | 9/2014 | Liu | |
| 2014/0331001 A1 | 11/2014 | Liu et al. | |
| 2014/0337540 A1 | 11/2014 | Johnson et al. | |
| 2015/0006663 A1 | 1/2015 | Huang | |
| 2016/0306768 A1* | 10/2016 | Mataya | G06F 13/4068 |
| 2016/0321195 A1* | 11/2016 | Ghosh | G06F 1/266 |
| 2017/0046295 A1* | 2/2017 | Schwemmer | G06F 13/4022 |

* cited by examiner

SCALABLE AND CONFIGURABLE NON-VOLATILE MEMORY MODULE ARRAY

RELATED APPLICATION DATA

This application claims the benefit of U.S. Patent Application Ser. No. 62/127,210, filed Mar. 2, 2015, which is hereby incorporated by reference.

BACKGROUND

The present inventive concepts relate to memory module arrays, and more particularly, to highly scalable and configurable non-volatile memory module arrays.

The number of modern devices that include non-volatile memory modules, such as flash memory modules, is increasing at a rapid pace. For example, Internet-enabled devices, computer server farms, mobile devices, high-speed networks, and the like, all take advantage of the unique characteristics of non-volatile memory modules including cost, capacity, and performance. To increase capacity and performance, some attempts have been made to group non-volatile memory modules into shared arrays.

But conventional non-volatile memory module arrays suffer from limited scaling capabilities and fixed configurations. For example, conventional approaches involve designing a unique or custom array for each particular application. Since each application has different requirements, targeting different applications requires different designs. This results in long design cycles and short product life spans. Embodiments of the present inventive concept address these and other limitations in the prior art.

BRIEF SUMMARY

Embodiments of the inventive concept include a non-volatile memory module array system. The system can include one or more non-volatile memory modules each including a first port, a second port, a plurality of solid state drives, a switch configured to connect the first and second ports to the plurality of solid state drives, and a port configuration logic section. The system can include a bus configured to be connected to at least one of the first port or the second port of the one or more non-volatile memory modules. The system can include a host configured to communicate with the one or more non-volatile memory modules via the bus. The port configuration logic section can be configured to toggle between a first port configuration associated with the second port and a second port configuration associated with the second port.

The port configuration logic section can include a first non-volatile configuration section configured to store the first port configuration associated with the second port. The first port configuration can be configured to cause the second port to operate as a downstream port. The port configuration logic section can include a second non-volatile configuration section configured to store the second port configuration associated with the second port. The second port configuration can be configured to cause the second port to operate as an upstream port.

Embodiments of the inventive concept can include a computer-implemented method for configuring a non-volatile memory module array, each of the non-volatile memory modules of the array having a first port and a second port. The method can include selecting, by a selector of a first non-volatile memory module from among the non-volatile memory modules, at least one of a first port configuration associated with the second port or a second port configuration associated with the second port. The method can include configuring the second port of the first non-volatile memory module to be an upstream port responsive to the selector selecting the second port configuration. The method can include configuring, responsive to the selector selecting the first port configuration, the second port of the first non-volatile memory module to be a downstream port relative to the first port.

Embodiment of the inventive concept can include a non-volatile memory module. The non-volatile memory module can include a first port, a second port, a plurality of solid state drives, a switch configured to connect the first and second ports to the plurality of solid state drives, and a port configuration logic section. The port configuration logic section can include a first non-volatile configuration section configured to store a first port configuration associated with the second port. The first port configuration can be configured to cause the second port to operate as a downstream port. The port configuration logic section can include a second non-volatile configuration section configured to store a second port configuration associated with the second port. The second port configuration can be configured to cause the second port to operate as an upstream port. The port configuration logic section can be configured to toggle between the first port configuration associated with the second port and the second port configuration associated with the second port.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
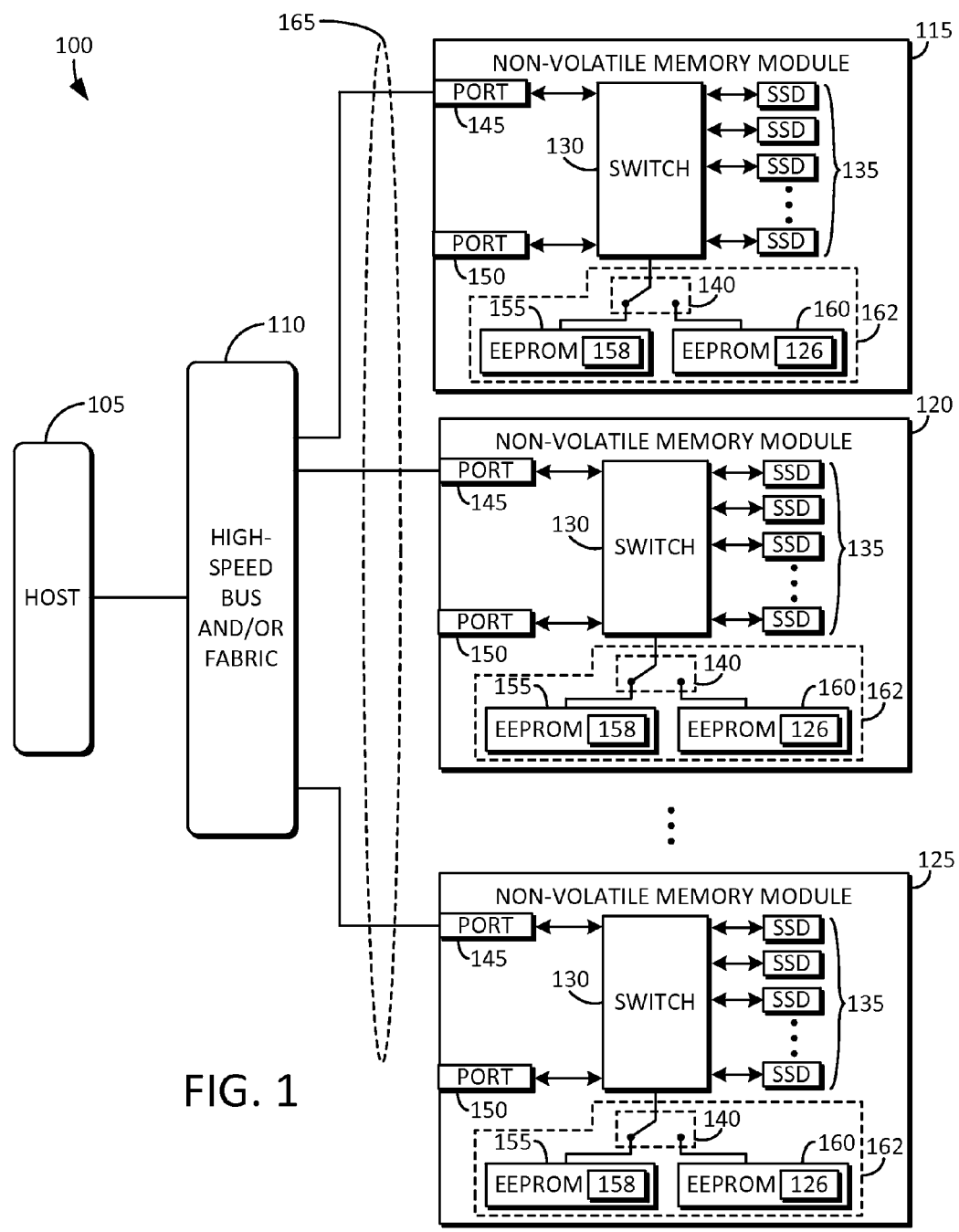
FIG. 1 is an example block diagram of a non-volatile memory module array system in a parallel scaling configuration with unused ports in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first non-volatile memory module could be termed a second non-volatile memory module, and, similarly, a second non-volatile memory module could be termed a first non-volatile memory module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include a highly scalable and configurable non-volatile memory module array system, which can fulfill multiple needs using a single design and different settings combinations. The non-volatile memory module array can include, for example, non-volatile memory express (NVMe) compatible solid-state drives (SSDs) that can be attached to a peripheral component interconnect express (PCIe) bus. The different settings combinations can be hardware setting combinations. Each non-volatile memory module can include a PCIe switch, which can fan out an upstream PCIe port to multiple downstream PCIe ports, thereby enabling connection to multiple NVMe modules. The non-volatile memory module array system can include a parallel scalability configuration, a cascading scalability configuration, an X2 bandwidth configuration, and/or a hybrid configuration.

FIG. 1 is an example block diagram of a non-volatile memory module array system 100 in a parallel scaling configuration with unused ports in accordance with embodiments of the inventive concept. The non-volatile memory module array system 100 can include one or more non-volatile memory modules (e.g., 115, 120, and 125). It will be understood that any suitable number of non-volatile memory modules can be included in the system. Each of the one or more non-volatile memory modules (e.g., 115, 120, and 125) can include a port 145, a port 150, one or more solid state drives (SSDs) 135, and a switch 130 configured to connect the port 145 and the port 150 to the solid state drives 135. The switch 130 can be, for example, a PCIe switch. In addition, each of the one or more non-volatile memory modules (e.g., 115, 120, and 125) can include a port configuration logic section 162. The port configuration logic section 162 can determine whether the port 150 is configured as an upstream port or a downstream port, as further described below. In this example embodiment, i.e., the parallel scaling configuration, the port 150 need not be used.

The non-volatile memory module array system 100 can include a high-speed bus and/or fabric 110. The high-speed bus and/or fabric 110 can include, for example, a high-speed PCIe bus or switched fabric. The high-speed bus and/or fabric 110 can be connected to at least one of the port 145 or the port 150 of the one or more non-volatile memory modules (e.g., 115, 120, and 125) via lines 165. In this example embodiment, i.e., the parallel scaling configuration, the high-speed bus and/or fabric 110 need not be connected to the port 150.

The non-volatile memory module array system 100 can include a host 105 configured to communicate with the one or more non-volatile memory modules (e.g., 115, 120, and 125) via the high-speed bus and/or fabric 110. The host 105 can include, for example, a host agent, a host computer, a host process, a host logic section, a server, or the like. The port 145 of the non-volatile memory module 115 can be coupled to the host 105 via the high-speed bus and/or high-speed fabric 110. The port 145 of the non-volatile memory module 120 can be coupled to the host 105 via the high-speed bus and/or high-speed fabric 110. The port 145 of the non-volatile memory module 125 can be coupled to the host 105 via the high-speed bus and/or high-speed fabric 110. The port 150 of each of the non-volatile memory modules (e.g., 115, 120, and 125) can be uncoupled from the host 105 in the parallel scaling configuration.

The port configuration logic section 162 can toggle between a first port configuration 158 associated with the port 150 and a second port configuration 126 associated with the port 150. The port configuration logic section 162 can include a non-volatile configuration section 155, which can store the first port configuration 158 associated with the port 150. The first port configuration 158 can cause the port 150 to operate as a downstream port. The port configuration logic section 162 can include a second non-volatile configuration section 160, which can store the second port configuration 126 associated with the port 150. The second port configuration 126 can cause the port 150 to operate as an upstream port. For example, a selector 140 of the port configuration logic section 162 of the various non-volatile memory modules (e.g., 115, 120, and 125) can cause the first port configuration 158 or the second port configuration 126 to be accessed, by the switch 130, so that the port 150 can be configured as either a downstream port or an upstream port. The selector 140 can be a multiplexor, a dip switch, a module strapping switch, or the like. The selector 140 can be controlled automatically via logic or manually by a human user. In the various embodiments disclosed herein and in the various figures, specific combinations of port configurations can be used, as more fully described below.

In the parallel scaling configuration, the port configuration logic section 162, including the selector 140, the electrically erasable programmable read-only memory (EEPROM) 155, and the EEPROM 160 need not be activated or otherwise used, and are further described below. The parallel scaling configuration can be advantageous, for example, when it is desirable for storage capacity and bandwidth to scale together. In other words, by adding one or more additional SSDs to the group of SSDs 135, the effect can be that both the storage capacity and bandwidth of the corresponding non-volatile memory module are scaled up.

Figure 2:
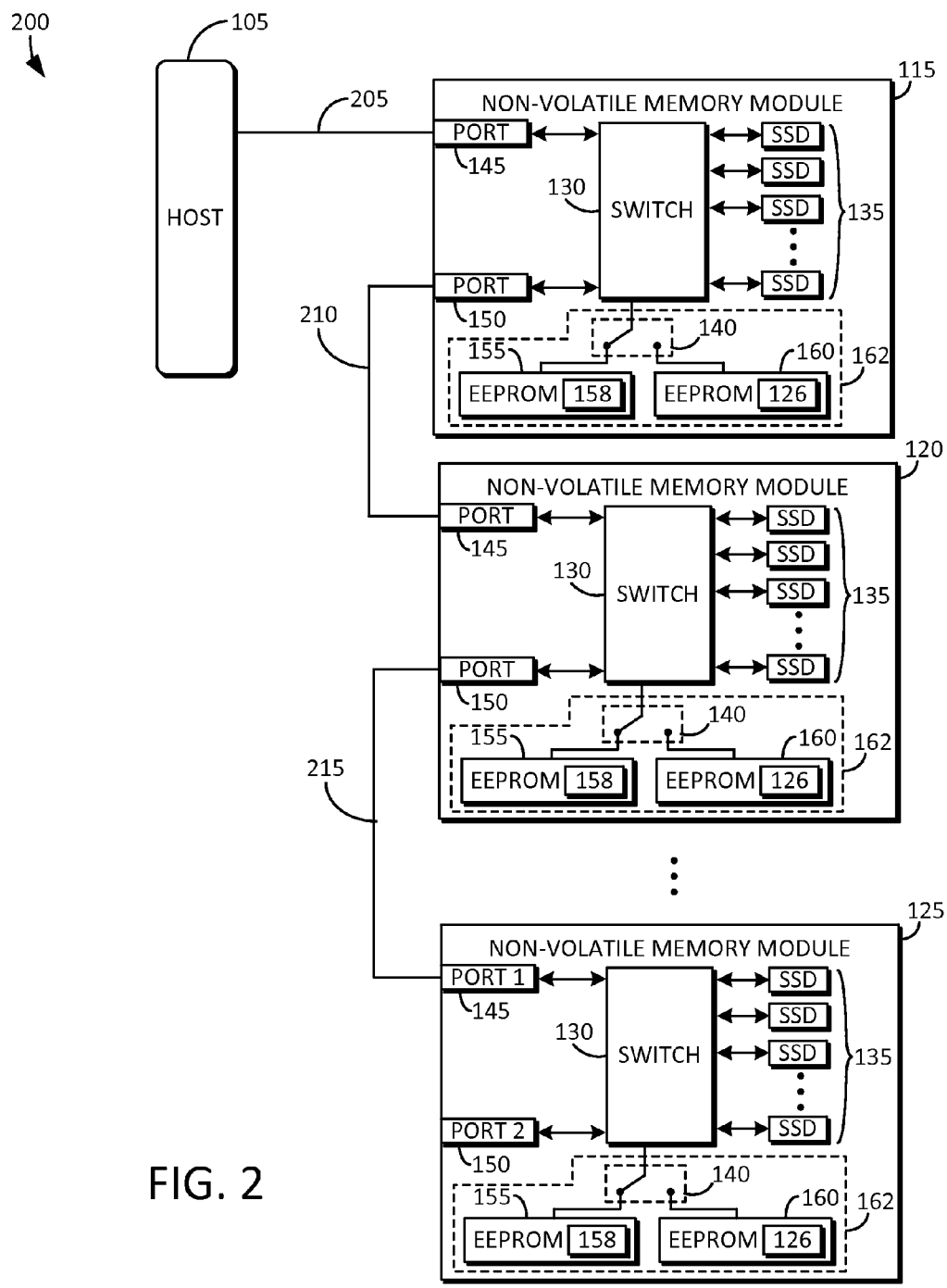
FIG. 2 is an example block diagram of a non-volatile memory module array system in a cascading scaling configuration with cascading ports in accordance with embodiments of the inventive concept.

FIG. 2 is an example block diagram of a non-volatile memory module array system 200 in a cascading scaling configuration with cascading ports in accordance with embodiments of the inventive concept. The non-volatile memory module array system 200 can include one or more non-volatile memory modules (e.g., 115, 120, and 125). Each of the one or more non-volatile memory modules (e.g., 115, 120, and 125) can include a port 145, a port 150, one or more solid state drives (SSDs) 135, and a switch 130 configured to connect the port 145 and the port 150 to the solid state drives 135. In addition, each of the one or more non-volatile memory modules (e.g., 115, 120, and 125) can include a port configuration logic section 162.

The port configuration logic section 162 can include the selector 140, which can cause the first port configuration 158 or the second port configuration 126 to be loaded from the first non-volatile configuration section 155 or the second non-volatile configuration section 160, respectively. The port 145 of the non-volatile memory module 115 can be coupled to the host 105, either directly, and/or via a high-speed bus and/or fabric 110 (of FIG. 1) via line 205. The port 150 of the non-volatile memory module 115 can be coupled to the port 145 of the non-volatile memory module 120 via line 210 in a cascaded fashion. The port configuration logic section 162 of the non-volatile memory module 115 can access the first port configuration 158 stored in the non-volatile configuration section 155 to cause the port 150 of the non-volatile memory module 115 to operate as a downstream port. For example, the selector 140 of the port configuration logic section 162 of the non-volatile memory module 115 can cause the first port configuration 158 to be accessed, by the switch 130, so that the port 150 can be configured as a downstream port.

The port 150 of the non-volatile memory module 120 can be coupled to the port 145 of the non-volatile memory module 125 via line 215 in a cascaded fashion. The port 150 of the non-volatile memory module 125 need not be used. The port configuration logic section 162 of the non-volatile memory module 120 can access the first port configuration 158 stored in the non-volatile configuration section 155 to cause the port 150 of the non-volatile memory module 120 to operate as a downstream port. For example, the selector 140 of the port configuration logic section 162 of the non-volatile memory module 120 can cause the first port configuration 158 to be accessed, by the switch 130, so that the port 150 can be configured as a downstream port.

The port 150 of the non-volatile memory module 115 that operates as a downstream port can be downstream from the port 145 of the non-volatile memory module 115. Similarly, the port 150 of the non-volatile memory module 120 that operates as a downstream port can be downstream from the port 145 of the non-volatile memory module 115, downstream from the port 150 of the non-volatile memory module 115, and downstream from the port 145 of the non-volatile memory module 120.

In the cascading scaling configuration, the port configuration logic section 162 can cause the first port configuration 158 stored on the EEPROM 155 to be activated or otherwise used for each of the non-volatile memory modules (e.g., 115, 120, and 125). The cascading scaling configuration can be advantageous, for example, when it is desirable for storage capacity to be scaled up while upstream bandwidth remains essentially unchanged. In other words, by adding one or more additional SSDs to the group of SSDs 135, the effect can be that the storage capacity of the corresponding non-volatile memory module is increased, while the bandwidth remains essentially unchanged. This can be particularly useful for low workload but high capacity storage applications.

Figure 3:
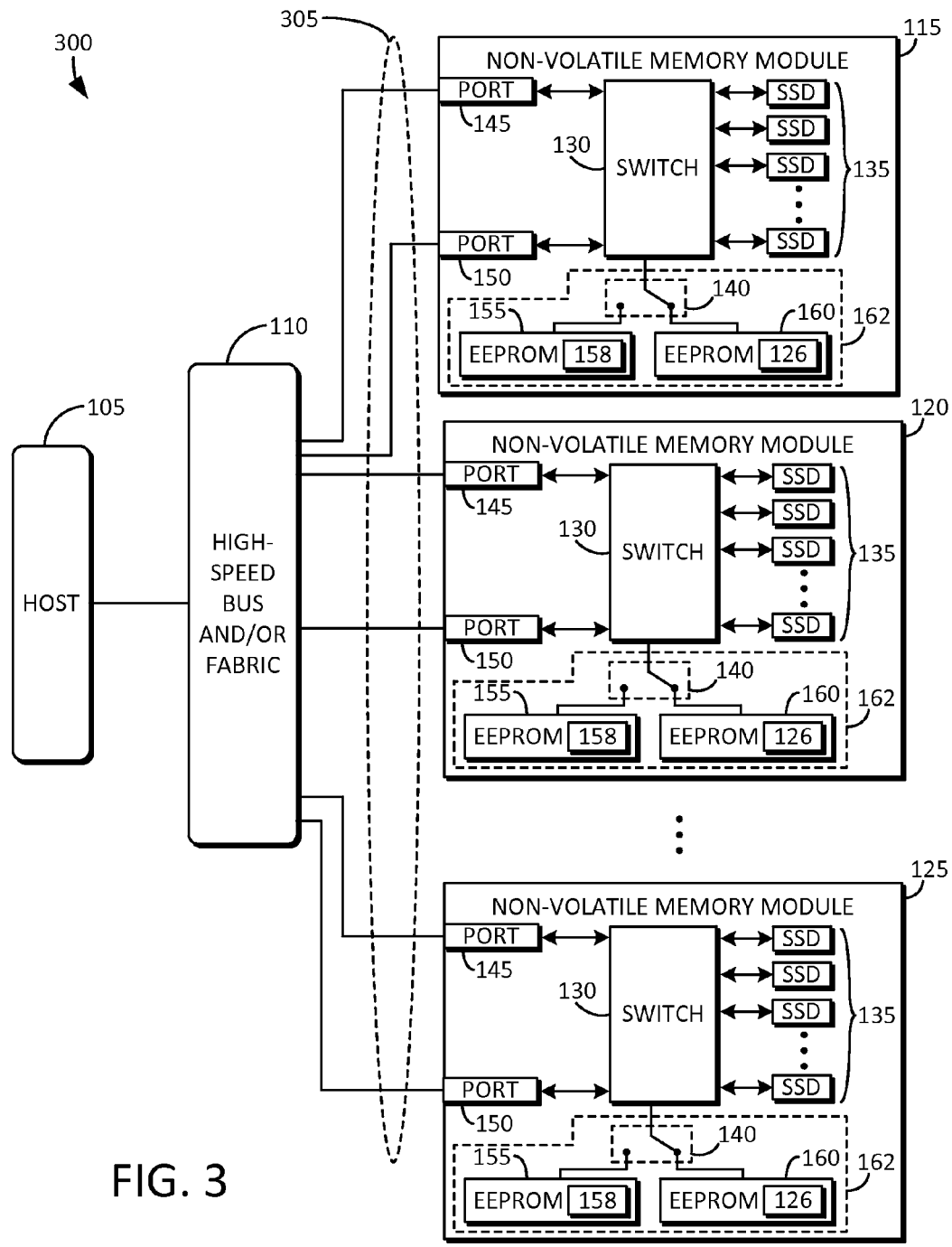
FIG. 3 is an example block diagram of a non-volatile memory module array system in an X2 bandwidth scaling configuration in accordance with embodiments of the inventive concept.

FIG. 3 is an example block diagram of a non-volatile memory module array system 300 in an X2 bandwidth scaling configuration in accordance with embodiments of the inventive concept. In the X2 (i.e., double) bandwidth scaling configuration, the port 145 of each of the non-volatile memory modules (e.g., 115, 120, and 125) can be coupled to the host 105 via the high-speed bus and/or fabric 110 and via lines 305. Moreover, the port 150 of each of the non-volatile memory modules (e.g., 115, 120, and 125) can be coupled to the host 105 via the high-speed bus and/or fabric 110 and via the lines 305.

The port configuration logic section 162 of the non-volatile memory module 115 can access the second port configuration 126 stored in the non-volatile configuration section 160 to cause the port 150 of each of the non-volatile memory modules (e.g., 115, 120, and 125) to operate as an upstream port. For example, the selector 140 of the port configuration logic section 162 of the non-volatile memory modules (e.g., 115, 120, and 125) can cause the second port configuration 126 to be accessed, by the switch 130, so that the port 150 can be configured as an upstream port.

The port configuration logic section 162 of the non-volatile memory module 120 can access the second port configuration 126 stored in the non-volatile configuration section 160 to cause the port 150 of the non-volatile memory module 120 to operate as an upstream port. Similarly, the port configuration logic section 162 of the non-volatile memory module 125 can access the second port configuration 126 stored in the non-volatile configuration section 160 to cause the port 150 of the non-volatile memory module 125 to operate as an upstream port.

In the X2 bandwidth configuration, the port configuration logic section 162 can cause the second port configuration 126 stored on the EEPROM 160 to be activated or otherwise used for each of the non-volatile memory modules (e.g., 115, 120, and 125). The X2 bandwidth configuration can be advantageous, for example, when it is desirable for performance to be doubled relative to the parallel scaling configuration, and more than doubled relative to the cascading scaling configuration. In other words, each non-volatile memory module can be made capable of X2 upstream bandwidth to meet the high performance centric application needs.

Figure 4:
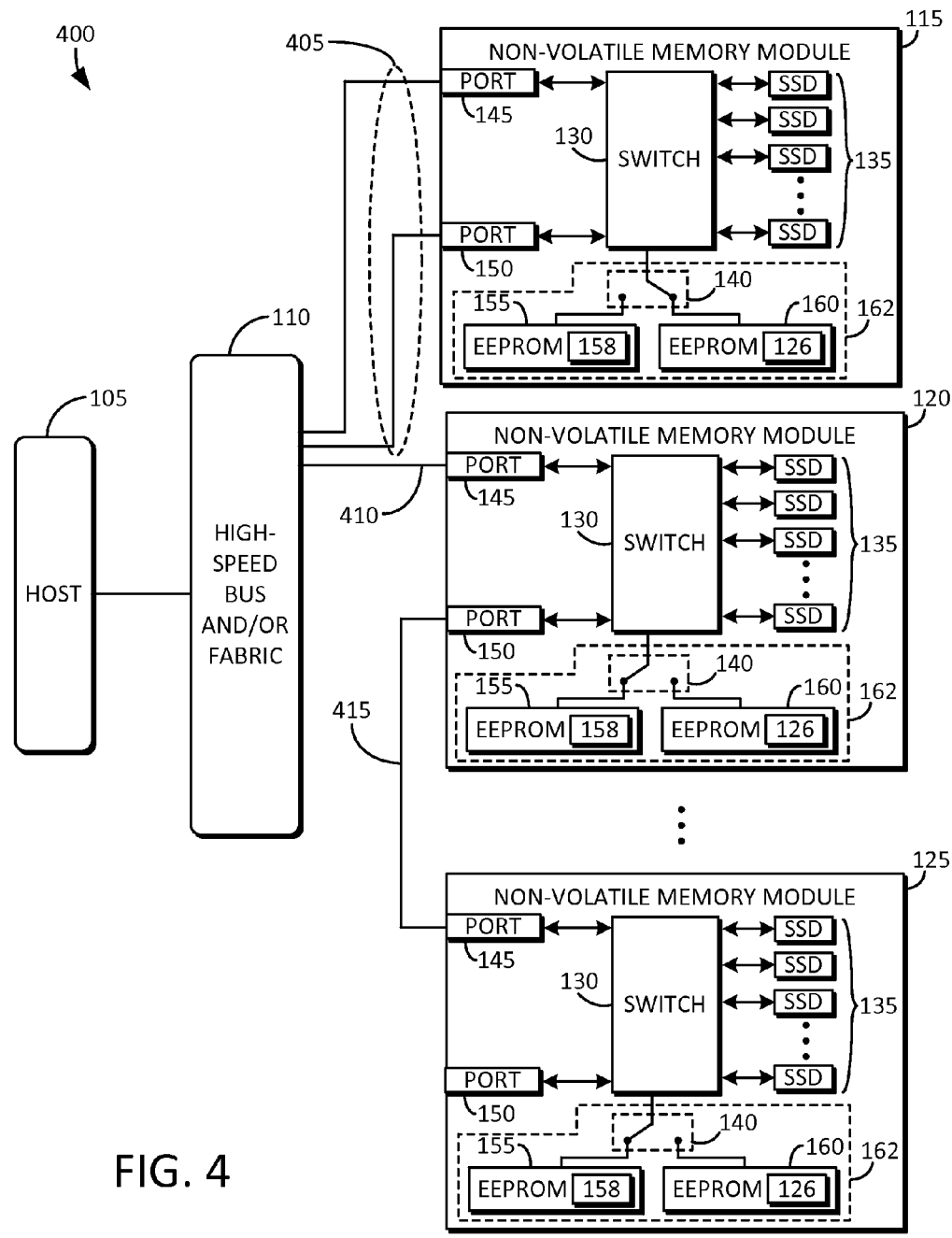
FIG. 4 is an example block diagram of a non-volatile memory module array system in a hybrid X2 bandwidth and cascading scaling configuration in accordance with embodiments of the inventive concept.

FIG. 4 is an example block diagram of a non-volatile memory module array system 400 in a hybrid X2 bandwidth and cascading scaling configuration in accordance with embodiments of the inventive concept. The port 145 of the non-volatile memory module 115 can be coupled to the host 105 via the high-speed bus and/or fabric 110 and via on of lines 405. The port 150 of the non-volatile memory module 115 can also be coupled to the host 105 via the high-speed bus and/or fabric 110 and via one of the lines 405.

The port configuration logic section 162 of the non-volatile memory module 115 can access the second port configuration 126 stored in the non-volatile configuration section 160 to cause the port 150 of the non-volatile memory module 115 to operate as an upstream port. For example, the selector 140 of the port configuration logic section 162 of the non-volatile memory module 115 can cause the second port configuration 126 to be accessed, by the switch 130, so that the port 150 can be configured as an upstream port.

The port 145 of the non-volatile memory module 120 can be coupled to the host 105 via the high-speed bus and/or fabric 110 and via line 410. The port 150 of the non-volatile memory module 120 can be coupled to the port 145 of the non-volatile memory module 125 via line 415. The port configuration logic section 162 of the non-volatile memory module 120 can access the first port configuration 158 stored in the non-volatile configuration section 155 to cause the port 150 of the non-volatile memory module 120 to operate as a downstream port. The port 150 of the non-volatile memory module 125 need not be used.

In the hybrid X2 bandwidth and cascading scaling configuration, the port configuration logic section 162 of the non-volatile memory module 115 can cause the second port configuration 126 stored on the EEPROM 160 to be activated or otherwise used for the non-volatile memory module 115, whereas the port configuration logic section 162 of the non-volatile memory module 120 can cause the first port configuration 158 stored on the EEPROM 155 to be activated or otherwise used for the non-volatile memory module 120. The hybrid X2 bandwidth and cascading scaling configuration can be advantageous, for example, when it is desirable for a portion of the system to have the capability of scaling up storage capacity while upstream bandwidth remains essentially unchanged, and another portion of the system to have the capability of scaling up performance in parallel.

Figure 5:
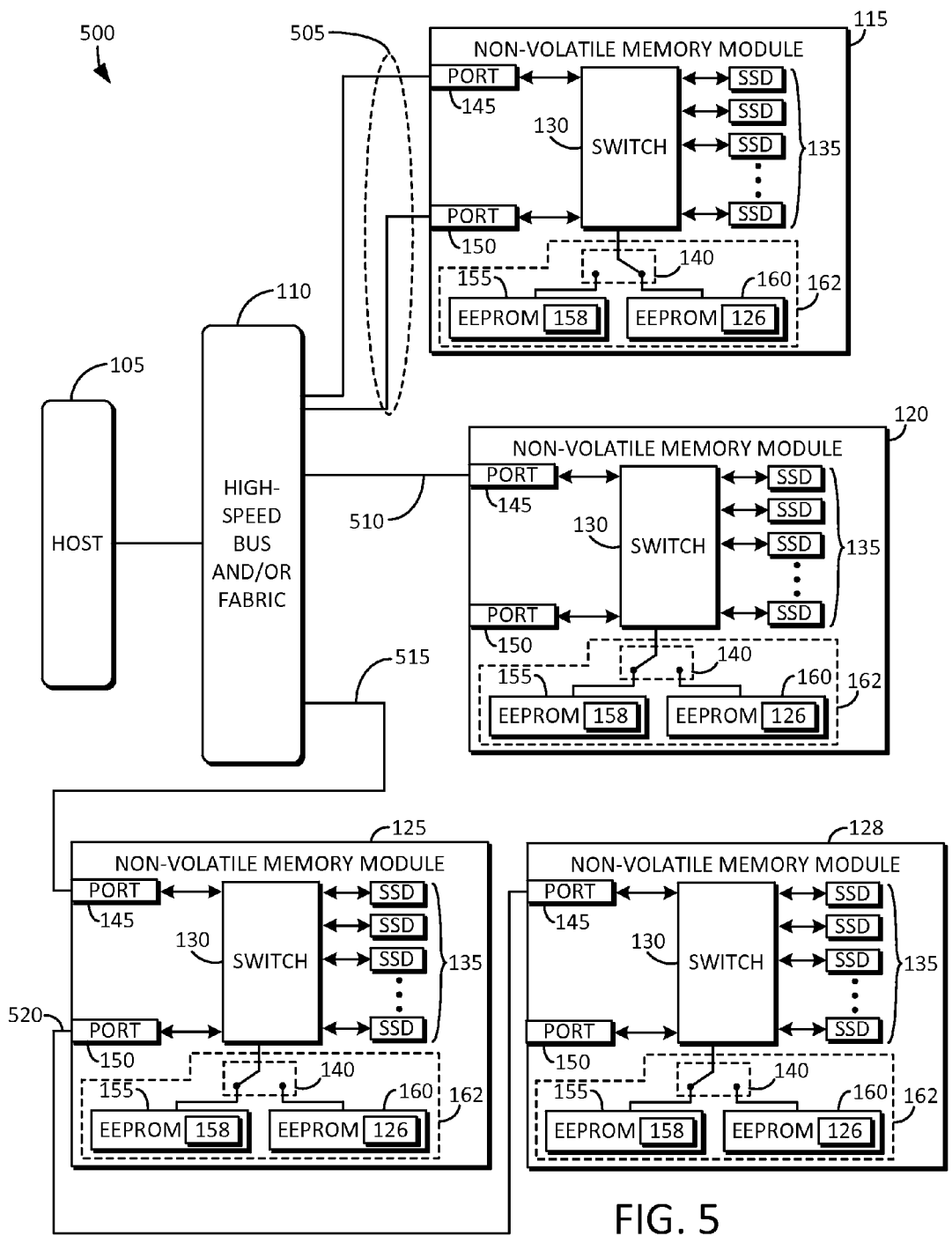
FIG. 5 is an example block diagram of a non-volatile memory module array system in a hybrid X2 bandwidth, parallel, and cascading scaling configuration in accordance with embodiments of the inventive concept.

FIG. 5 is an example block diagram of a non-volatile memory module array system 500 in a hybrid X2 bandwidth, parallel, and cascading scaling configuration in accordance with embodiments of the inventive concept. The port 145 of the non-volatile memory module 115 can be coupled to the host 105 via the high-speed bus and/or fabric 110 and via one of lines 505. The port 150 of the non-volatile memory module 115 can also be coupled to the host 105 via the high-speed bus and/or fabric 110 via one of the lines 505.

The port configuration logic section 162 of the non-volatile memory module 115 can access the second port configuration 126 stored in the non-volatile configuration section 160 to cause the port 150 of the non-volatile memory module 115 to operate as an upstream port. For example, the selector 140 of the port configuration logic section 162 of the non-volatile memory module 115 can cause the second port configuration 126 to be accessed, by the switch 130, so that the port 150 can be configured as an upstream port.

The port 145 of the non-volatile memory module 120 can be coupled to the host 105 via the high-speed bus and/or fabric 110 and via line 510. The port 150 of the non-volatile memory module 120 need not be used.

The port 145 of the non-volatile memory module 125 can be coupled to the host 105 via the high-speed bus and/or fabric 110 and via line 515. The port 150 of the non-volatile memory module 125 can be coupled to the port 145 of the non-volatile memory module 128 via line 520. The port 150 of the non-volatile memory module 128 need not be used.

The port configuration logic section 162 of the non-volatile memory module 125 can access the first port configuration 158 stored in the non-volatile configuration section 155 to cause the port 150 of the non-volatile memory module 125 to operate as a downstream port.

In the hybrid X2 bandwidth, parallel, and cascading scaling configuration, the port configuration logic section 162 of the non-volatile memory module 115 can cause the second port configuration 126 stored on the EEPROM 160 to be activated or otherwise used for the non-volatile memory module 115, whereas the port configuration logic section 162 of the non-volatile memory module 125 can cause the first port configuration 158 stored on the EEPROM 155 to be activated or otherwise used for the non-volatile memory module 125. The hybrid X2 bandwidth, parallel, and cascading scaling configuration can be advantageous, for example, when it is desirable for a first portion of the system to have the capability of scaling up storage capacity while upstream bandwidth remains essentially unchanged, another portion of the system to have the capability of scaling up performance in parallel, and yet another portion of the system to have the capability of scaling up storage capacity and bandwidth together.

The following Table 1 illustrates some example configurations of the non-volatile memory module array systems as described in detail above:

| Configuration | Bandwidth/Performance | Capacity | Expansion Settings |
|---|---|---|---|
| Parallel Scaling | (number of non-volatile memory modules) times (unit bandwidth per non-volatile memory module) | (number of non-volatile memory modules) times (unit capacity per non-volatile memory module) | Add non-volatile memory modules in parallel-second port configuration irrelevant |
| Cascading Scaling | unit bandwidth of a non-volatile memory module | (number of non-volatile memory modules) times (unit capacity per non-volatile memory module) | Add non-volatile memory modules in a cascading formation-the EEPROM image to configure the second port as a downstream port is selected |
| X2 Bandwidth | (number of non-volatile memory modules) times (unit bandwidth per non-volatile memory module) times 2 | (number of non-volatile memory modules) times (unit capacity per non-volatile memory module) | Add non-volatile memory modules in a direct connection formation-the EEPROM image to configure the second port as an upstream port is selected |

Figure 6:
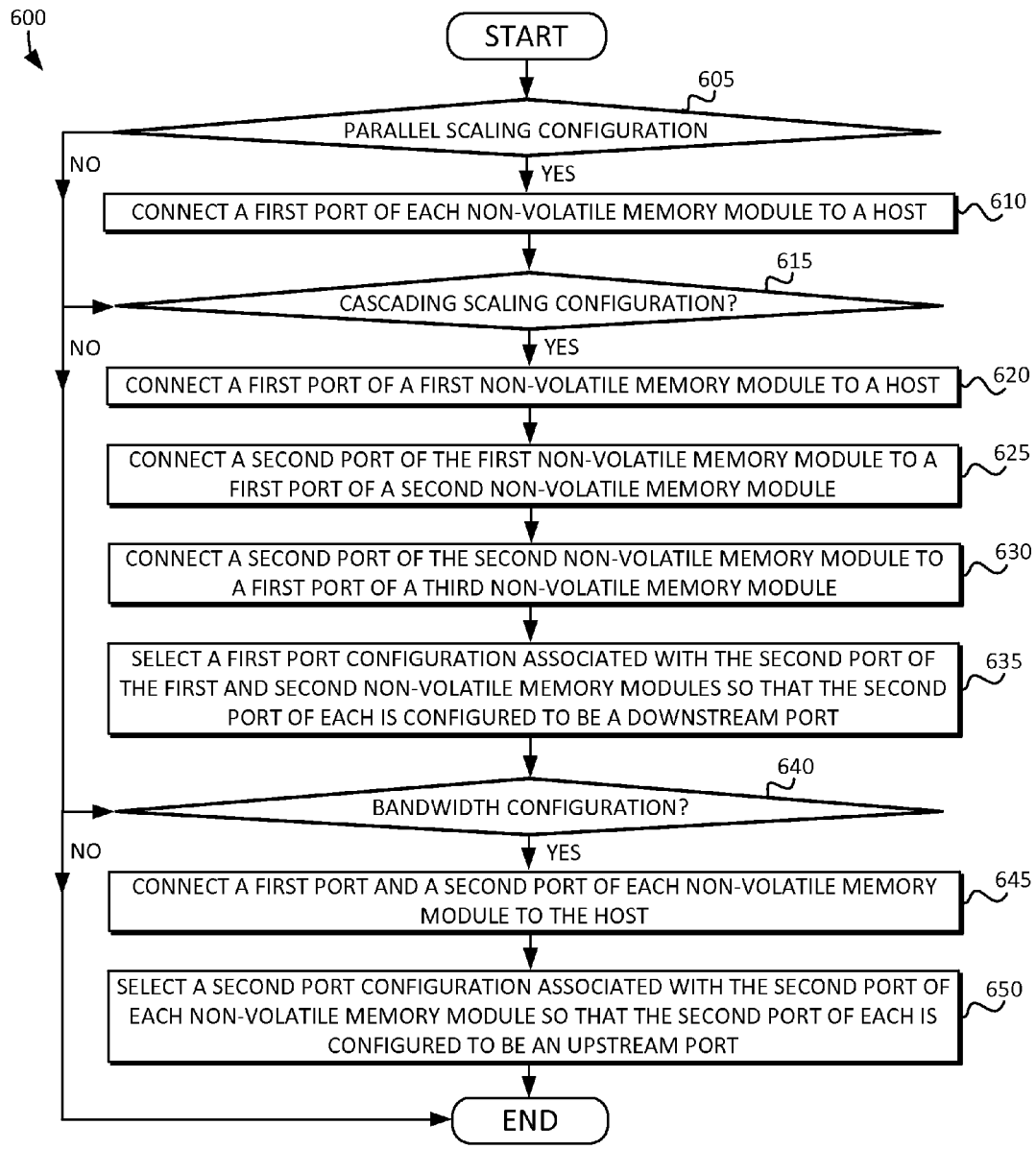
FIG. 6 illustrates a flow diagram including a technique for configuring a non-volatile memory module array in a parallel scaling configuration, a cascading scaling configuration, and/or a bandwidth configuration in accordance with embodiments of the inventive concept.

FIG. 6 illustrates a flow diagram 600 including a technique for configuring a non-volatile memory module array in a parallel scaling configuration, a cascading scaling configuration, and/or a bandwidth configuration in accordance with embodiments of the inventive concept.

The technique can begin at 605, where a determination can be made whether a parallel scaling configuration of the non-volatile memory module array is desired. If YES, a first port of each non-volatile memory module can be connected to a host at 610, for example, via a high-speed bus and/or fabric. Otherwise, if NO, the flow can proceed to 615, where another determination can be made whether a cascading scaling configuration of the non-volatile memory module array is desired.

If YES, the flow can proceed to 620, where a first port of a first non-volatile memory module can be connected to the host. At 625, a second port of the first non-volatile memory module can be connected to a first port of a second non-volatile memory module. At 630, a second port of the second non-volatile memory module can be connected to a first port of a third non-volatile memory module, and so forth. At 635, a first port configuration associated with the second port of the first and second non-volatile memory modules can be selected so that the second port of each of the non-volatile memory modules is configured to be a downstream port. Otherwise, if NO, meaning that a cascading scaling configuration is not desired, the flow can proceed to 640, where another determination can be made whether a bandwidth configuration is desired.

If YES, the flow can proceed to 645, where a first port and a second port of each non-volatile memory module of the array can be connected to the host. At 650, a a second port configuration associated with the second port of each of the non-volatile memory modules of the array can be selected so that the second port of each of the non-volatile memory modules is configured to be an upstream port.

It will be understood that the steps need not occur in the illustrated order, but rather, can occur in a different order and/or with intervening steps.

Figure 7:
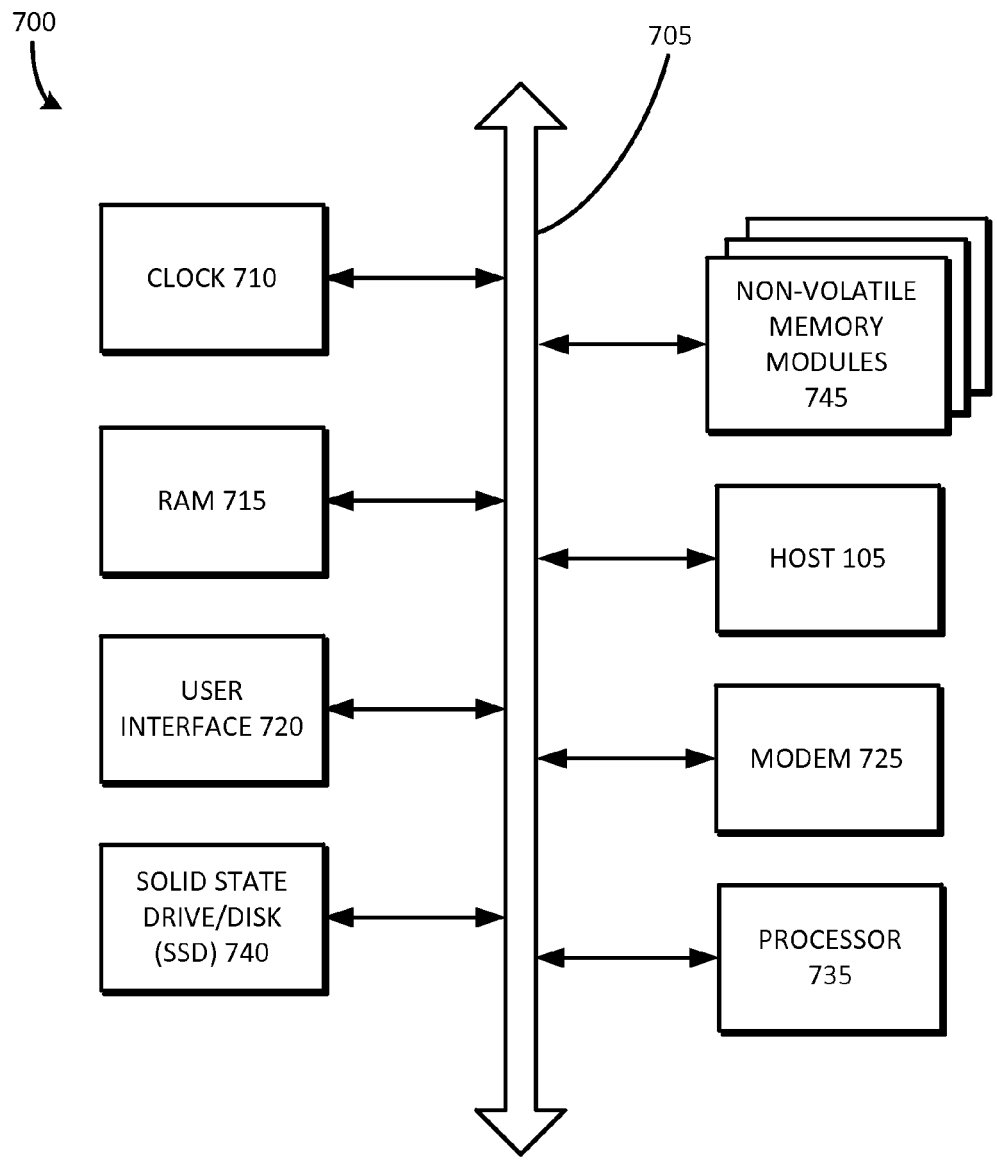
FIG. 7 is a block diagram of a computing system including the non-volatile memory modules and the host of FIG. 1.

FIG. 7 is a block diagram of a computing system 700 including the host 105 and the non-volatile memory modules 745 (e.g., similar to or the same as those of FIG. 1). The computing system 700 can include a clock 710, a random access memory (RAM) 715, a user interface 720, a modem 725 such as a baseband chipset, a solid state drive/disk (SSD) 740, and/or a processor 735, any or all of which may be electrically coupled to a system bus 705. The system bus 705 can be a high-speed bus and/or fabric, as described above. The host 105 can correspond to that described in detail above, and as set forth herein, and may also be electrically coupled to the system bus 705. The host 105 can include or otherwise interface with the non-volatile memory modules 745, the clock 710, the random access memory (RAM) 715, the user interface 720, the modem 725, the solid state drive/disk (SSD) 740, and/or the processor 735.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A non-volatile memory module array system, comprising:
one or more non-volatile memory modules each including a first port, a second port, a plurality of solid state drives, a switch configured to connect the first and second ports to the plurality of solid state drives, and a port configuration logic section,
wherein the port configuration logic section is configured to toggle between a first port configuration associated with the second port and a second port configuration associated with the second port;
a first non-volatile configuration section configured to store the first port configuration associated with the second port, wherein the first port configuration is configured to cause the second port to operate as a downstream port; and
a second non-volatile configuration section configured to store the second port configuration associated with the second port, wherein the second port configuration is configured to cause the second port to operate as an upstream port.

2. The non-volatile memory module array system of claim 1, wherein the port configuration logic section further comprises: a selector configured to cause at least one of the first port configuration or the second port configuration to be loaded from the first non-volatile configuration section or the second non-volatile configuration section, respectively.

3. The non-volatile memory module array system of claim 1, wherein: the one or more non-volatile memory modules includes a first non-volatile memory module and a second non-volatile memory module; the first port of the first non-volatile memory module is configured to be coupled to a host via a bus; the first port of the second non-volatile memory module is configured to be coupled to the host via the bus; the second port of the first non-volatile memory module is configured to be uncoupled from the host; and the second port of the second non-volatile memory module is configured to be uncoupled from the host.

4. The non-volatile memory module array system of claim 1, wherein: the one or more non-volatile memory modules include a first non-volatile memory module and a second non-volatile memory module; the first port of the first non-volatile memory module is configured to be coupled to a host via a bus; the second port of the first non-volatile memory module is configured to be coupled to the first port of the second non-volatile memory module; and the port configuration logic section of the first non-volatile memory module is configured to access the first port configuration stored in the first non-volatile configuration section to cause the second port of the first non-volatile memory module to operate as a downstream port.

5. The non-volatile memory module array system of claim 4, wherein:
the one or more non-volatile memory modules further include a third non-volatile memory module;
the second port of the second non-volatile memory module is configured to be coupled to the first port of the third non-volatile memory module; and
the port configuration logic section of the second non-volatile memory module is configured to access the first port configuration stored in the first non-volatile configuration section to cause the second port of the second non-volatile memory module to operate as a downstream port.

6. The non-volatile memory module array system of claim 5, wherein:
the second port of the first non-volatile memory module configured to operate as the downstream port is downstream from the first port of the first non-volatile memory module; and
the second port of the second non-volatile memory module configured to operate as the downstream port is downstream from the first port of the first non-volatile memory module, downstream from the second port of the first non-volatile memory module, and downstream from the first port of the second non-volatile memory module.

7. The non-volatile memory module array system of claim 1, wherein: the one or more non-volatile memory modules include a first non-volatile memory module and a second non-volatile memory module; the first port of the first non-volatile memory module is configured to be coupled to a host via a bus; the second port of the first non-volatile memory module is configured to be coupled to the host via the bus; the port configuration logic section of the first non-volatile memory module is configured to access the second port configuration stored in the second non-volatile configuration section to cause the second port of the first non-volatile memory module to operate as an upstream port; the first port of the second non-volatile memory module is configured to be coupled to the host via the bus; the second port of the second non-volatile memory module is configured to be coupled to the host via the bus; and the port configuration logic section of the second non-volatile memory module is configured to access the second port configuration stored in the second non-volatile configuration section to cause the second port of the second non-volatile memory module to operate as an upstream port.

8. The non-volatile memory module array system of claim 7, wherein:
the one or more non-volatile memory modules further include a third non-volatile memory module;
the first port of the third non-volatile memory module is configured to be coupled to the host via the bus;
the second port of the third non-volatile memory module is configured to be coupled to the host via the bus; and
the port configuration logic section of the third non-volatile memory module is configured to access the second port configuration stored in the second non-volatile configuration section to cause the second port of the third non-volatile memory module to operate as an upstream port.

9. The non-volatile memory module array system of claim 1, wherein: the one or more non-volatile memory modules include a first non-volatile memory module, a second non-volatile memory module, and a third non-volatile memory module; the first port of the first non-volatile memory module is configured to be coupled to a host via a bus; the second port of the first non-volatile memory module is configured to be coupled to the host via the bus; the port configuration logic section of the first non-volatile memory module is configured to access the second port configuration stored in the second non-volatile configuration section to cause the second port of the first non-volatile memory module to operate as an upstream port; the first port of the second non-volatile memory module is configured to be coupled to the host via the bus; the second port of the second non-volatile memory module is configured to be coupled to the first port of the third non-volatile memory module; and the port configuration logic section of the second non-volatile memory module is configured to access the first port configuration stored in the first non-volatile configuration section to cause the second port of the second non-volatile memory module to operate as a downstream port.

10. A computer-implemented method for configuring a non-volatile memory module array, each of the non-volatile memory modules of the array having a first port and a second port, the method comprising:
   selecting, by a selector of a first non-volatile memory module from among the non-volatile memory modules, at least one of a first port configuration associated with the second port or a second port configuration associated with the second port;
   configuring the second port of the first non-volatile memory module to be an upstream port responsive to the selector selecting the second port configuration; and
   configuring, responsive to the selector selecting the first port configuration, the second port of the first non-volatile memory module to be a downstream port relative to the first port.

11. The computer-implemented method of claim 10, further comprising:
   selecting, by a selector of a second non-volatile memory module from among the non-volatile memory modules, at least one of a first port configuration associated with the second port or a second port configuration associated with the second port;
   configuring the second port of the second non-volatile memory module to be an upstream port responsive to the selector selecting the second port configuration; and
   configuring, responsive to the selector selecting the first port configuration, the second port of the second non-volatile memory module to be a downstream port relative to the first port.

12. The computer-implemented method of claim 10, further comprising:
   connecting, in a parallel scaling configuration, the first port of the first non-volatile memory module from among the non-volatile memory modules to a host via a bus;
   connecting, in the parallel scaling configuration, the first port of a second non-volatile memory module from among the non-volatile memory modules to the host via the bus; and
   connecting, in the parallel scaling configuration, the first port of a third non-volatile memory module from among the non-volatile memory modules to the host via the bus.

13. The computer-implemented method of claim 10, further comprising:
   connecting, in a cascading scaling configuration, the first port of the first non-volatile memory module from among the non-volatile memory modules to a host via a bus;
   connecting, in the cascading scaling configuration, the second port of the first non-volatile memory module from among the non-volatile memory modules to the first port of a second non-volatile memory module from among the non-volatile memory modules; and
   connecting, in the cascading scaling configuration, the second port of the second non-volatile memory module from among the non-volatile memory modules to the first port of a third non-volatile memory module from among the non-volatile memory modules.

14. The computer-implemented method of claim 13, further comprising:
   selecting, by the selector of the first non-volatile memory module from among the non-volatile memory modules, the first port configuration associated with the second port;
   configuring the second port of the first non-volatile memory module to be a downstream port responsive to the selector selecting the first port configuration;
   selecting, by a selector of the second non-volatile memory module from among the non-volatile memory modules, a first port configuration associated with the second port; and
   configuring the second port of the second non-volatile memory module to be a downstream port responsive to the selector selecting the first port configuration.

15. The computer-implemented method of claim 10, further comprising:
   connecting, in a bandwidth configuration, the first port and the second port of the first non-volatile memory module from among the non-volatile memory modules to a host via a bus;
   connecting, in the bandwidth configuration, the first port and the second port of a second non-volatile memory module from among the non-volatile memory modules to the host via the bus; and
   connecting, in the bandwidth configuration, the first port and the second port of a third non-volatile memory module from among the non-volatile memory modules to the host via the bus.

16. The computer-implemented method of claim 15, further comprising:
   selecting, by a selector of the first non-volatile memory module from among the non-volatile memory modules, the second port configuration associated with the second port;
   configuring the second port of the first non-volatile memory module to be an upstream port responsive to the selector selecting the second port configuration;
   selecting, by a selector of the second non-volatile memory module from among the non-volatile memory modules, a second port configuration associated with the second port;
   configuring the second port of the second non-volatile memory module to be an upstream port responsive to the selector selecting the second port configuration;
   selecting, by a selector of the third non-volatile memory module from among the non-volatile memory modules, a second port configuration associated with the second port; and
   configuring the second port of the third non-volatile memory module to be an upstream port responsive to the selector selecting the second port configuration.

17. The computer-implemented method of claim 10, further comprising:
   connecting, in a hybrid configuration, the first port and the second port of the first non-volatile memory module from among the non-volatile memory modules to a host via a bus;
   connecting, in the hybrid configuration, the first port of a second non-volatile memory module from among the non-volatile memory modules to the host via the bus; and
   connecting, in the hybrid configuration, the second port of the second non-volatile memory module from among the non-volatile memory modules to the first port of a third non-volatile memory module from among the non-volatile memory modules.

18. The computer-implemented method of claim 17, further comprising:
- selecting, by a selector of the first non-volatile memory module from among the non-volatile memory modules, the second port configuration associated with the second port;
- configuring the second port of the first non-volatile memory module to be an upstream port responsive to the selector selecting the second port configuration;
- selecting, by a selector of the second non-volatile memory module from among the non-volatile memory modules, a first port configuration associated with the second port; and
- configuring the second port of the second non-volatile memory module to be a downstream port responsive to the selector selecting the first port configuration.

19. A non-volatile memory module, comprising:
- a first port;
- a second port;
- a plurality of solid state drives;
- a switch configured to connect the first and second ports to the plurality of solid state drives; and
- a port configuration logic section, including:
    - a first non-volatile configuration section configured to store a first port configuration associated with the second port, wherein the first port configuration is configured to cause the second port to operate as a downstream port; and
    - a second non-volatile configuration section configured to store a second port configuration associated with the second port, wherein the second port configuration is configured to cause the second port to operate as an upstream port,
- wherein the port configuration logic section is configured to toggle between the first port configuration associated with the second port and the second port configuration associated with the second port.

20. The non-volatile memory module of claim 19, wherein the port configuration logic section further comprises:
- a selector configured to cause at least one of the first port configuration or the second port configuration to be loaded from the first non-volatile configuration section or the second non-volatile configuration section, respectively.

21. The non-volatile memory module of claim 19, wherein:
- the port configuration logic section is configured to access the first port configuration stored in the first non-volatile configuration section to cause the second port to operate as a downstream port.

22. The non-volatile memory module of claim 19, wherein:
- the port configuration logic section is configured to access the second port configuration stored in the second non-volatile configuration section to cause the second port to operate as an upstream port.

\* \* \* \* \*